Patented June 14, 1949

2,473,112

UNITED STATES PATENT OFFICE 2,473,112

PREPARATION OF SULFONIC ACID SALTS OF DIGUANIDES

Wallace Frank Short, Gordon Ivan Hobday, and Peter Oxley, Nottingham, England, assignors to Boots Pure Drug Company Limited, Nottingham, England, a company of Great Britain No Drawing. Application March 28, 1947, Serial No. 737,994. In Great Britain April 3, 1946

3 Claims. (Cl. 260—501)

This invention relates to the production of organic sulphonic acid salts of diguanides and to the diguanides which may be prepared from them and in particular to the sulphonic acid salts of diguanides of the general formula

where $R_1$ and $R_2$ are members of the group consisting of hydrogen atoms and alkyl, aryl, aralkyl and alicyclic radicals or may together form a polymethylene chain, and X is a hydrocarbon radical.

It has been proposed to form sulphonic acid salts of guanidines by heating mixtures of dicyandiamide with two molecular proportions of ammonium or primary or secondary mono-amine salts of organic sulphonic acids at moderately high temperatures in the neighbourhood of 220° to 260° C.

It has now been found that, if dicyandiamide is heated at a lower temperature than that used in the reaction mentioned above with a smaller quantity, for example one molecular proportion, of an ammonium salt of a sulphonic acid, the product obtained in preponderating amount and in good yield is the sulphonic acid salt of diguanide. Further, if an amine salt of the sulphonic acid is heated under similar conditions with dicyandiamide, the sulphonate of a diguanide substituted at the $N^1$ atom by the alkyl, aralkyl or aryl group or groups originally contained in the amine is obtained.

According to the present invention, therefore, a sulphonic acid salt of a diguanide of the general formula given above is obtained by heating dicyandiamide with a sulphonic acid salt of the general formula $NHR_1R_2.X.SO_3H$ where $R_1$, $R_2$ and X have the aforementioned significance under such conditions of temperature and period of heating that the reaction product consists in proponderating amount of the desired salt.

For this purpose, the temperature of reaction should be in the neighbourhood of 150° and the molecular proportion of the dicyandiamide to the salt of the sulphonic acid should be less than 2:1 and is preferably about 1:1. The duration of heating necessary to obtain the optimum yield of the desired reaction product may be determined by making periodical tests and when once the optimum time of reaction has been determined for any particular starting materials, the tests need not, of course, be repeated.

In some cases the reaction appears to be slightly exothermic.

The sulphonic acid salts may be converted by methods known per se into the corresponding diguanides from which other salts may be produced.

In order that the invention may be comprehended and readily carried into effect, some examples will now be given to illustrate how the processes of the invention may be carried out.

Example 1

In the preparation of diguanide sulphate monohydrate a mixture of 175 g. of ammonium benzenesulphonate and 84 g. of dicyandiamide is stirred while being quickly heated to a temperature of 170° C. The fused mixture is maintained at a temperature of 170–172° C. for 5 minutes and is then poured with stirring into 1 litre of water. The solution obtained contains diguanide benzenesulphonate.

An ammoniacal copper sulphate solution, made by mixing 270° c. c. of concentrated ammonium hydroxide solution with a solution of 250 g. of copper sulphate crystals in 1250 c. c. of water, is then added until the supernatant liquor is blue. The red copper salt of diguanide which is thereby precipitated is filtered off, washed with water and dissolve in 100 c. c. of 20% v./v. sulphuric acid at ca. 60° C. On cooling this solution diguanide sulphate monohydrate separates in the form of crystals which are filtered off, washed with a little cold water and dried.

Example 2

In the preparation of 1-methyldiguanide benzenesulphonate a mixture of 4.2 g. of dicyandiamide and 9.45 g. of methylamine benzenesulphonate is maintained at a temperature of 160° C. for 20 minutes. After cooling, the product is crystallised from isopropyl alcohol whereby 1-methyldiguanide benzenesulphonate is obtained in the form of crystals having a melting point of 146° C. (Found: N, 25.6: $C_9H_{15}O_3N_5S$ requires N, 25.6%.)

Example 3

In the preparation of isopropyldiguanide toluene-p-sulphonate a mixture of 6.93 g. isoproylamine toluene-p-sulphonate and 2.52 g. of dicyandiamide is maintained at a temperature of 160° C. for one hour. After cooling, the product is crystallised from isopropyl alcohol, whereby isopropyldiguanide toluene-p-sulphonate is obtained in the form of crystals having a melting point of 161–161.5%° C. (Found: N, 22.4%; $C_{11}H_{19}O_3N_5S$ requires N. 22.2%.)

*Example 4*

In the preparation of 1-cyclohexyldiguanide toluene-p-sulphonate a mixture of 4.2 g. of dicyandiamide and 13.55 g. of cyclohexylamine toluene-p-sulphonate is heated for 1 hour in a bath maintained at a temperature of 140° C. After cooling, the product is crystallised from water whereby 1-cyclohexyldiaguanide toluene-p-sulphonate is obtained in the form of crystals having a melting point of 158° C. (Found: N, 19.7%; $C_{15}H_{25}O_3N_5S$ requires N, 19.7%.)

*Example 5*

In the preparation of 1:1-dimethyldiguanide toluene-p-sulphonate a mixture of 4.2 g. of dicyandiamide and 10.85 g. of dimethylamine toluene-p-sulphonate is maintained at a temperature of 160° C. for 15 minutes. After cooling, the product is crystallised from isopropyl alcohol whereby 1:1-dimethyldiguanide toluene-p-sulphonate is obtained in the form of crystals having a melting point of 150° C. (Found: N, 23.3%; $C_{11}H_{19}O_3N_5S$ requires N, 23.3%.)

*Example 6*

In the preparation of 1:1-diethyldiguanide toluene-p-sulphonate a mixture of 4.2 g. of dicyandiamide and 12.25 g. of diethylamine toluene-p-sulphonate is heated for 1 hour in a bath maintained at a temperature of 140° C. After cooling, the product is dissolved in water and the solution is mixed with an aqueous ammoniacal solution containing 5.0 g. of copper toluene-p-sulphonate. The copper diethyldiguanide derivative which is precipitated is filtered off and then suspended in boiling water and hydrogen sulphide is passed into the suspension until decomposition of the copper-diethyldiguanide derivative is complete. The aqueous solution, freed from copper sulphide by filtration, is then evaporated to dryness. 1:1-diethyldiguanide toluene-p-sulphonate which remains is purified by crystallisation from acetone whereby it is obtained in the form of crystals having a melting point of 142° C. (Found: N, 21.2; $C_{13}H_{23}O_3N_5S$ requires N, 21.3%.)

*Example 7*

In the preparation of 1:1-pentamethylenediguanide toluene-p-sulphonate a mixture of 4.2 g. of dicyandiamide and 12.85 g. of piperidine toluene-p-sulphonate is heated for 2 hours in a bath maintained at a temperature of 140° C. After cooling the product is crystallised from water and the crystalline product is filtered off and dried in vacuo at a temperature of 100° C. 1:1-pentamethylenediguanide toluene-p-sulphonate is thus obtained in the form of crystals having a melting point of 177° C. (Found: N, 20.3: $C_{14}H_{23}O_3N_5S$ requires N, 20.5%.)

*Example 8*

In the preparation of 1-benzyldiguanide toluene-p-sulphonate a mixture of 4.2 g. of dicyandiamide and 13.95 g. of benzylamine toluene-p-sulphonate is heated for 30 minutes in a bath maintained at a temperature of 140° C. After cooling, the product is dissolved in water and the solution is worked up through the copper derivative as described in Example 6. 1-benzyldiguanide toluene-p-sulphonate is obtained in the form of crystals having a melting point of 142–3° C.

*Example 9*

In the preparation of 1-phenyldiguanide a mixture of 1.68 g. of dicyandiamide and 5.02 g. of aniline benzenesulphonate is maintained at a temperature of 160° C. for 15 minutes. During heating the mixture melts and then re-solidifies. After cooling, the product is crystallised from alcohol whereby 1-phenyldiguanide benzenesulphonate is obtained in the form of crystals having a melting point of 181° C. (Found: N, 20.9: $C_{14}H_{17}O_3N_5S$ requires N, 20.9%.) By adding 5 N sodium hydroxide solution to a cold concentrated aqueous solution of 1-phenyldiguanide benzenesulphonate, 1-phenyldiguanide separates in the form of crystals having a melting point of 145° C.

*Example 10*

In the preparation of 1-(p-sulphonamidophenyl) diguanide benzenesulphonate a mixture of 2.1 g. of dicyandiamide and 8.25 g. of sulphanilamide benzenesulphonate is maintained at a temperature of 160° C. for 20 minutes. After cooling, the product is crystallised from water whereby 1-(p-sulphonamidophenyl) diguanide benzenesulphonate is obtained in the form of crystals having a melting point of 205–206° C. with decomposition. (Found: N, 20.2:

$C_{14}H_{18}O_5N_6S_2$ requires N, 20.3%.)

*Example 11*

In the preparation of 1-methyl-1-phenyldiguanide benzenesulphonate a mixture of 4.2 g. of dicyandiamide and 13.25 g. of methylaniline benzenesulphonate is heated for 40 minutes in a bath maintained at a temperature of 140° C. After cooling the product is crystallised from isopropyl alcohol whereby 1 - methyl - 1 - phenyldiguanide benzenesulphonate is obtained in the form of crystals having a melting point of 147.5° C. (Found: N, 20.2; $C_{15}H_{19}O_3N_5S$ requires N, 20.1%.)

*Example 12*

In the preparation of 1:1-diphenyldiguanide toluene-p-sulphonate a mixture of 0.84 g. of dicyandiamide and 3.41 g. of diphenylamine toluene-p-sulphonate is heated for 30 minutes in a bath maintained at a temperature of 140° C. After cooling, the product is crystallised from water whereby 1:1-diphenyldiguanide toluene-p-sulphonate is obtained in the form of crystals having a melting point of 210.5° C. (Found: N, 16.5; $C_{21}H_{23}O_3N_5S$ requires N, 16.5%.)

We claim:

1. A process for the production of sulphonic acid salts of diguanides of the general formula

RN.C(:NH).NH.C(:NH)NH₂ where R is a member of the class consisting of the divalent pentamethylene radical and pairs of members of the class consisting of hydrogen atoms and alkyl, aryl, aralkyl and alicyclic radicals which comprises heating a mixture of dicyandiamide with substantially one molecular proportion of a salt selected from the class consisting of benzene sulphonic acid salts and toluene sulphonic acid salts of substances of the general formula RNH at a temperature within the range from the fusion temperature of the mixture to 180° C.

2. A process as defined in claim 1 in which the mixture is heated at a temperature of from about 140° C. to about 170° C. for from about five minutes to about two hours.

3. A process as defined in claim 1 in which the mixture is heated at a temperature of about 150° C.

WALLACE FRANK SHORT.
GORDON IVAN HOBDAY.
PETER OXLEY.

REFERENCES CITED

The following references are of record in the file of this patent:

UNITED STATES PATENTS

| Number | Name | Date |
|---|---|---|
| 2,222,350 | Keller et al. | Nov. 19, 1940 |
| 2,223,935 | Daniels et al. | Dec. 3, 1940 |
| 2,252,400 | Hill et al. | Aug. 12, 1941 |